United States Patent Office 3,049,373
Patented Aug. 14, 1962

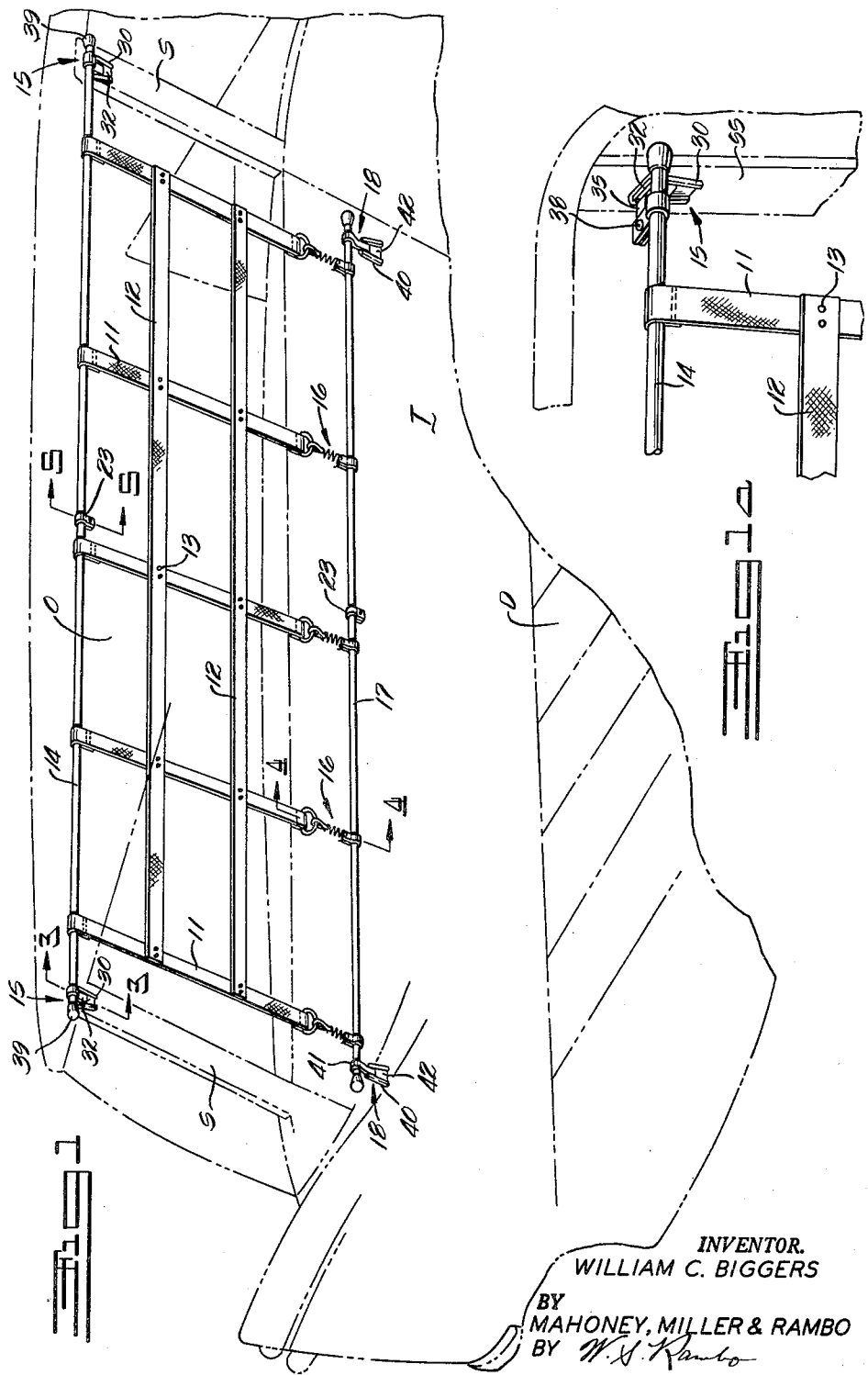

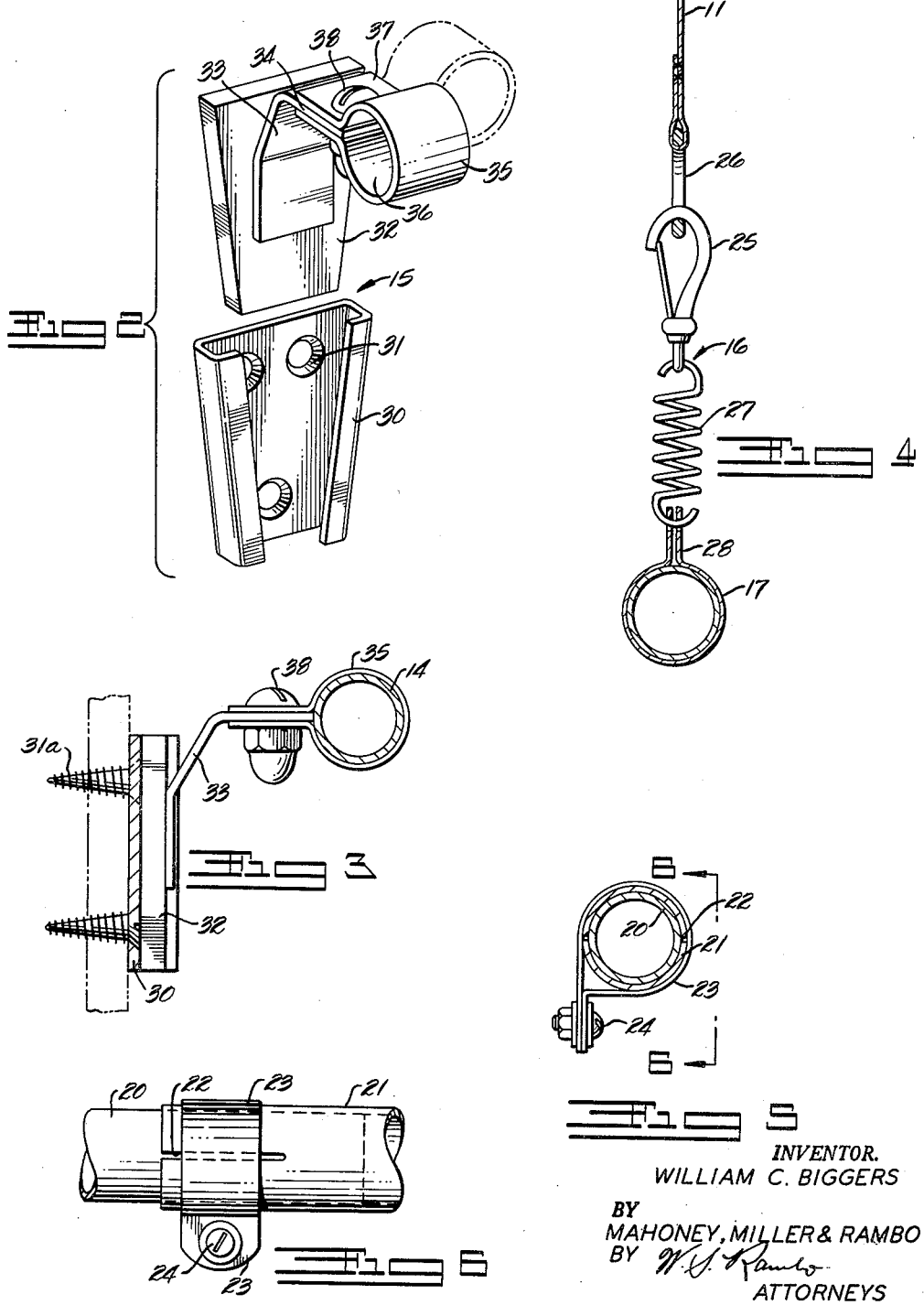

3,049,373
SAFETY GUARD ATTACHMENT FOR THE TAILGATE OPENINGS OF STATION WAGON VEHICLES
William C. Biggers, 134 S. Brinker Ave., Columbus, Ohio
Filed Apr. 3, 1961, Ser. No. 100,376
3 Claims. (Cl. 296—106)

My invention relates to a safety guard attachment for the tailgate openings of station wagon vehicles. It has to do, more particularly, with a guard attachment for positioning in association with the opening over the closed tailgate of a station wagon when the movable window provided for such opening is moved into open position.

According to my invention, I provide a tailgate guard attachment for the usual associated opening for preventing the falling or jumping out through such opening of children, or animals, or for preventing objects from falling out or being blown out through such opening when the tailgate window is open for ventilating purposes. My attachment comprises mainly an open flexible mesh webbing together with novel means for mounting such open mesh webbing in association with the opening. The mounting means is such that the webbing can be readily positioned in association with openings of various sizes. Also, the mounting means is versatile so that it can be used in connection with various different makes and models of station wagon vehicles. Furthermore, the mounting means is such that although normally the open mesh webbing will be securely held in position over the opening, it can be completely removed easily when desired or can be swung out of the way relative to the opening during loading or unloading of the wagon when the tailgate is lowered.

Various other objects and advantages will be apparent from the drawings and as this description progresses.

In the accompanying drawings, I have illustrated the preferred embodiment of my invention and in these drawings:

FIGURE 1 is a perspective view looking from the interior of the station wagon body rearwardly toward the tailgate thereof and showing my guard attachment in position over the tailgate opening.

FIGURE 1a is a view showing the top mounting bracket of FIGURE 1 in a different relationship when applied to a different type of station wagon.

FIGURE 2 is a perspective view of a mounting bracket used with my attachment.

FIGURE 3 is a vertical sectional view through the bracket taken along line 3—3 of FIGURE 1.

FIGURE 4 is a vertical sectional view taken along line 4—4 of FIGURE 1 through a connector for connecting the webbing to a support rod.

FIGURE 5 is a vertical sectional view taken on line 5—5 of FIGURE 1 showing a clamp for a telescoping rod support.

FIGURE 6 is an elevational view taken on line 6—6 of FIGURE 5.

With reference to the drawings, in FIGURE 1 I have illustrated my attachment applied to a certain type or model of station wagon body. In FIGURE 1a, I have illustrated my invention applied to a different type of body. It will be understood that these bodies are shown for illustrative purposes and that my invention is capable of application to many other types of station wagon bodies or the like.

In FIGURE 1, the body is shown as including the deck D, the hinged tailgate T and an opening O above the tailgate which can be closed by a window of a suitable type (not shown), for example, one which is in a vertically swinging door or one which moves vertically into and out of the tailgate T. In the example shown in FIGURE 1, supporting posts S are provided at the ends of the substantially rectangular opening O and these posts S have a forwardly facing flat surface. In the example shown in FIGURE 1a, each of the posts SS has an inwardly facing surface. As will be apparent, my invention is capable of being mounted regardless of whether the posts face forwardly or are disposed in angular relationship to the center line of the body.

According to my invention, the attachment includes a flexible webbing which may be of woven belting, canvas, plastic, leather straps or any other suitable material. This webbing includes the vertical tapes or strips 11 and the horizontal strips 12 criss-crossed and preferably riveted together as indicated at 13. The upper end of each of the tapes 11 is looped around an upper rod 14 which is adapted to extend transversely of the opening O and to be mounted above the opening adjacent the roof of the body. This upper rod 14 is mounted by means of upper brackets 15 at each end thereof which are attached to the supports S or SS. The lower ends of the tapes 11 are connected by spring and hook units 16 to a transversely disposed lower rod 17. This lower rod 17 is mounted on the inner surface of the tailgate T by means of the lower brackets 18.

Each of the rods 14 and 17 is of telescopic construction for ease in expanding and contracting it to fit various station wagon bodies. In FIGURES 5 and 6, the detailed structure of the telescopic rods is indicated. It will be noted that each rod comprises a smaller section 20 which slides in a larger section 21. The larger section is split at its inner end, as indicated at 22, and an adjustable clamping band 23 is provided around this split. The clamping band 23 is provided with a clamping bolt 24 by means of which the clamping band may be tightened around the split section to cause it to grip the inner section 20. Thus, both of the rods 14 and 17 may be adjusted readily as to length and then clamped in adjusted condition.

Each of the units 16 for connecting the lower end of a tape 11 to the lower rod 17 comprises a hook 25 of the snap-locking type which cooperates with a loop or eye 26 on the lower end of the tape 11. The hook is connected to the upper end of a tensile spring 27. The lower end of this spring is hooked into eye openings in the upstanding lugs of the split collar 28 which surrounds the rod 17.

Each of the upper brackets 15 comprises a downwardly converging tapered guide 30 which is provided with screw openings 31 for receiving screws 31a by means of which it may be mounted on the support S or SS. For cooperating with this tapered guide the bracket 15 is provided with a complemental mounting portion or wedge member 32. This member 32 is provided with a clip 33 fixed thereto which has an outwardly extending horizontal pivot lug 34. This pivot lug 34 is for mounting a rod-receiving socket portion 35 which includes a sleeve-like socket 36 for receiving the end of the rod 14. This socket portion 35 carries a bifurcated extension 37 which straddles the pivot lug 34. A clamping bolt 38 is passed through the cooperating lugs and can be released to permit relative pivoting or swiveling or to clamp the lugs in adjusted position. The ends of the rod 14 are provided with heads 39 which will prevent sliding of the socket members 35 off the ends thereof when the attachment is removed from the station wagon.

The lower brackets 18 are substantially like the upper brackets except that they are not provided with the swivel connections between the socket members and the wedge members. Each bracket does include a socket member 41 for receiving the rod 17, the socket member being rigidly fixed to a wedge member 42. Each of these wedge members 42 cooperates with a guide member 40. The guide members 40 are similarly attached to the tailgate T at the inner surface thereof. It will be noted that the guides 40 are reversed relative to the guides 30 in that they converge upwardly. It will be apparent that if the guides 40 are spaced properly below the guides 30 and the respective guides have the various wedge members 32 and 42 positioned therein, the spring and hook units 16 will wedge all the wedge members 32 and 42 in their respective guides 30 and 40. As indicated in FIGURE 2, the socket member 35 may be swiveled relative to the wedge member 32 to permit proper positioning of the brackets 15 on the support S or SS whether the surfaces thereof face forwardly as in FIGURE 1, or inwardly at an angle as in FIGURE 1a.

It will be apparent that to mount the attachment on a station wagon, the only members which need to be fastened thereto are the tapered guides 30 and 40. With these guides fastened to the wagon as indicated, the attachment may be mounted merely by slipping the wedges 32 and the wedges 42 in their respective cooperating guides 30 and 40 and they will be wedged in position by the yieldable force exerted by the spring and hook units 16. The entire guard attachment can be removed easily by slipping the wedges 32 and 42 out of their respective guides. This will be permitted since the spring units 16 can be extended readily for this purpose.

During loading and unloading of the station wagon, it is merely necessary to remove the wedges 42 from the guides 40 on the tailgate T and swing the rod 17 upwardly out of the way if necessary. The tailgate can then be swung vertically without having the attachment cause interference.

It will be apparent from the above description that I provide a simple and inexpensive attachment which serves as a safety guard for covering the tailgate opening and which will provide for ventilation even though it will prevent the movement of objects through the opening. Also, it will be apparent that the attachment is so designed that it can be mounted on various types of station wagon bodies.

Other advantages will be readily apparent.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what I claim is:

1. An attachment for the tailgate opening of a station wagon vehicle or the like comprising a flexible webbing for covering the opening, an upper rod extending transversely of the opening and a lower rod extending transversely of the opening, both of said rods comprising extensible and contractible telescoping sections, said flexible webbing including tapes connected at their upper ends to said upper rod, means for removably and resiliently connecting the lower ends of said tapes to said lower rod, said means comprising hook and spring units, brackets for removably attaching the lower rod to the tailgate, brackets for removably attaching the upper rod to supports adjacent the opening, one of said last-named brackets being provided at each end of the upper rod, each of said last-named brackets comprising a rod-receiving sleeve portion and a mounting portion which are swiveled together for relative movement about a pivot at right angles to the axis of the sleeve portion to permit disposition of the mounting portion at different angles relative to the axis of the rod.

2. An attachment according to claim 1 in which the first-named brackets for the lower rod comprise tapered mounting guides attached to the tailgate and tapered wedge members having thereon sleeve-like sockets for receiving said lower rod, said upper brackets also including tapered mounting guides for receiving said mounting portions which are in the form of tapered wedge members, the tapered guides of the upper brackets converging toward their lower ends and the tapered guides of the lower brackets converging toward their upper ends whereby the pull exerted by said spring and hook units will tend to pull said rods toward each other and will thereby wedge the wedge members in their cooperating guides.

3. An attachment according to claim 2 in which one of the telescoping sections of each rod is split and has a clamp cooperating therewith.

References Cited in the file of this patent

UNITED STATES PATENTS

| | | |
|---|---|---|
| 894,116 | Choate | July 21, 1908 |
| 2,740,642 | Atwood | Apr. 3, 1956 |
| 2,864,648 | Bland | Dec. 16, 1958 |
| 2,939,364 | Doswell et al. | June 7, 1960 |